United States Patent [19]
Cook

[11] 3,771,947
[45] Nov. 13, 1973

[54] APPARATUS AND METHOD FOR HEATING FLOWABLE MATERIAL

[75] Inventor: Ronald R. Cook, Omaha, Nebr.

[73] Assignee: Charles E. Lakin, Omaha, Nebr.

[22] Filed: Feb. 18, 1972

[21] Appl. No.: 227,406

[52] U.S. Cl. .................................... 432/95, 34/171
[51] Int. Cl. .............................................. F27b 1/00
[58] Field of Search .................... 263/30; 34/171; 432/95, 96

[56] References Cited
UNITED STATES PATENTS

| | | | |
|---|---|---|---|
| 1,869,705 | 8/1932 | Miscampbell | 263/30 |
| 2,020,504 | 11/1935 | Hantla | 263/30 |
| 2,139,378 | 12/1938 | Myers et al. | 263/30 X |

*Primary Examiner*—John J. Camby
*Attorney*—James H. Tilberry et al.

[57] ABSTRACT

Apparatus for heating flowable material in a clean, efficient and quiet manner includes a hollow upright tower. Flowable material is introduced into the upper portion of the tower and falls therethrough under the influence of gravity. A plurality of vertically-spaced and reversely inclined downwardly sloping steps are positioned within the tower. Flowable material falling through the tower strikes the steps and travels in somewhat of a zig-zag path to increase the residence time of the flowable material within the tower. Gas burners are positioned for directing very high temperature and very high velocity ribbons of gas transversely of the tower against the flowable material while it is in a free fall condition between at least certain of the steps. The high temperature and high velocity gas fluidizes and heats the flowable material. High velocity is imparted to the gas by conversion of thermal energy to kinetic energy in the burners. The steps within the tower are provided by a plurality of vertically stacked non-metallic heat insulating modular elements of special construction. The modular elements form part of a heat insulating liner and freely float relative to an outer metal skin on the tower to accommodate relative expansion and contraction between the liner and skin. A feed means in the upper portion of the tower substantially continuously feeds flowable material into the tower in a substantially continuous wide band stream of substantially uniform thickness extending substantially entirely across the entire width of the tower and steps. The burners extend upwardly from the lower portion of the tower in vertically-spaced relationship and terminate short of the uppermost plurality of steps in the upper portion of the tower. The uppermost plurality of steps provide a plurality of cool drop zones in which the flowable material falls without being directly contacted by hot gases from a burner. Gases from the other burners are exhausted vertically through the tower and pass through the flowable material while it is in a free fall condition in the cool drop zones. This filters any dust present in the material; lowers the temperature of the exhaust gases; and preheats the flowable material for optimum efficiency.

70 Claims, 14 Drawing Figures

United States Patent [19]
Cook
[11] 3,771,947
[45] Nov. 13, 1973
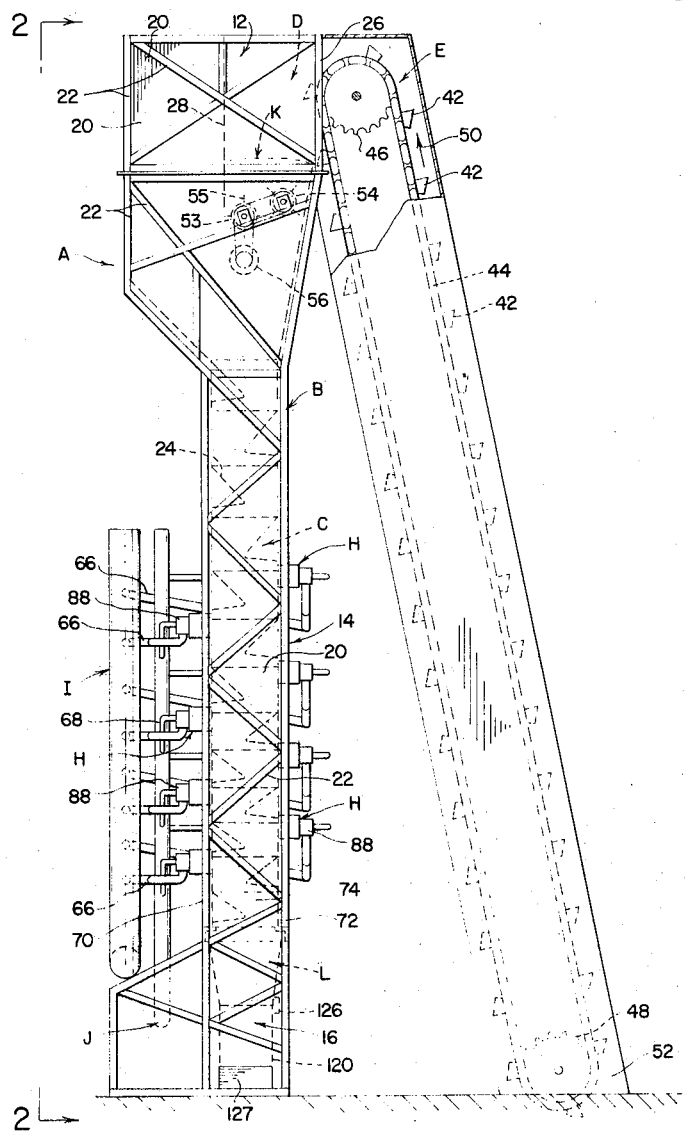

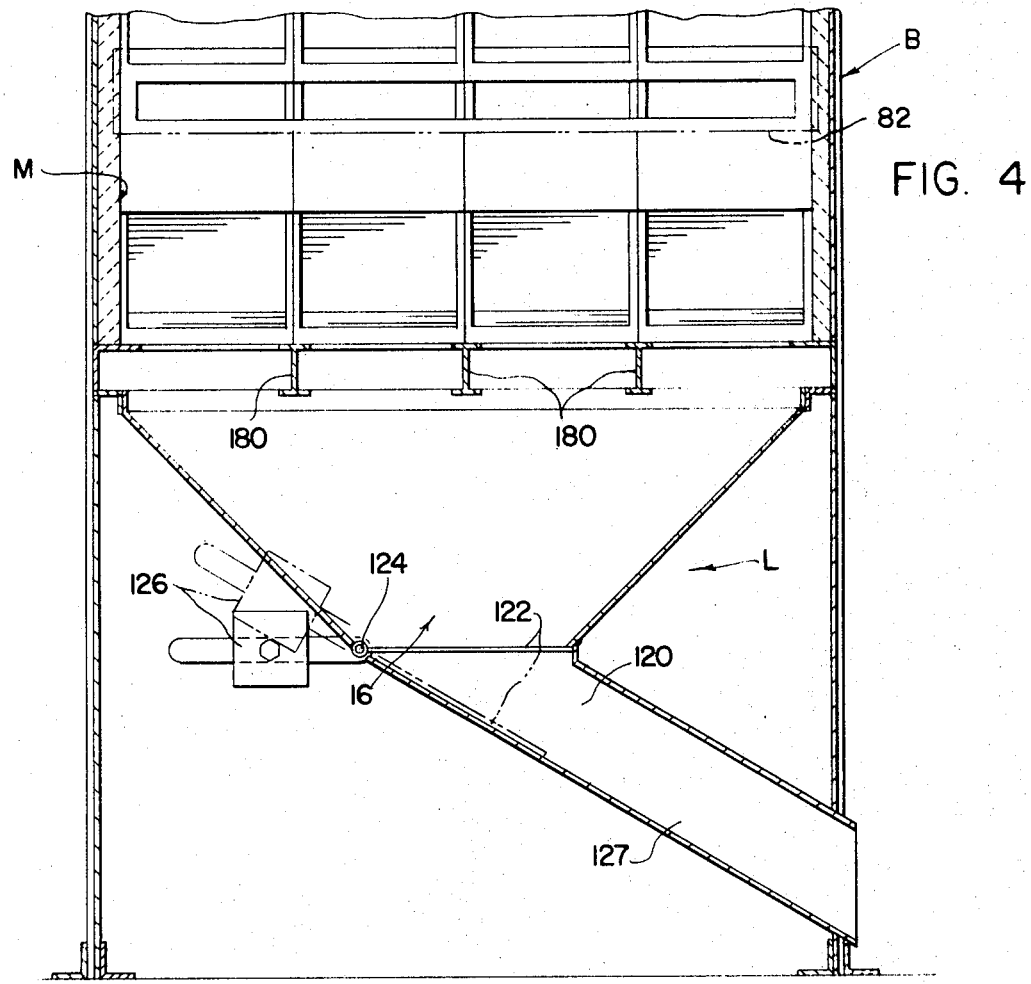
FIG. 4
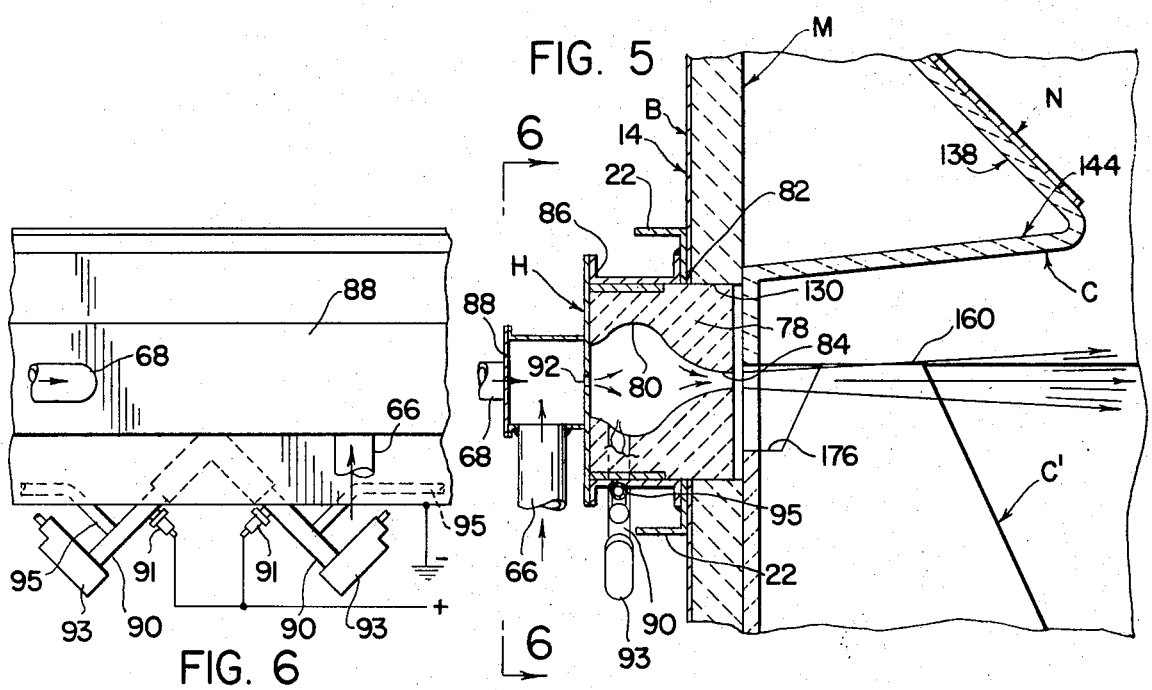
FIG. 5
FIG. 6

PATENTED NOV 13 1973 3,771,947

APPARATUS AND METHOD FOR HEATING FLOWABLE MATERIAL

BACKGROUND OF THE INVENTION

This application pertains to the art of heating and more particularly to extremely rapid heating of flowable material. The invention is particularly applicable to heating and drying wet aggregate for use in making asphalt paving material and will be described with particular reference thereto. However, it will be appreciated that the invention has broader applications and may be used for heating other materials including liquids.

It is necessary that aggregate used for manufacturing asphalt pavement be at a temperature of 275°-325° F. Aggregate is commonly dried in a rotary kiln through which hot air and gases are forced by a blower. Such kilns are extremely complicated, and expensive to manufacture and operate. Rotary kilns of the type described are not capable of withstanding extremely high temperatures and a long residence time for the aggregate is required. Rotary kilns are also extremely noisy. The noise is primarily due to the fact that rotary kilns usually have only one fuel burner operating at an extremely high temperature and producing an extremely high number of BTU's per hour. In a very broad sense, this can be compared with an unmuffled jet engine. The noise of the burner itself, and high frequency vibrations imparted to the apparatus by operation of the burner, creates a nuisance in the vicinity of the kiln and can impair the hearing of persons attending the kiln. These kilns, and the blowers for forcing hot air therethrough, cannot operate at temperatures in excess of around 1,800° F. This requires mixture of supplemental air with hot gases from the burner and results in very low thermal efficiency. Residence time of the aggregate is several minutes because of the low temperature differential between the aggregate and hot air. Aggregate of the type described also contains a large amount of fines which form dust. The dust is picked up by the moving hot air stream and presents an air pollution problem. The dust is usually collected by passing the air stream through cyclone separators or the like. It is common to collect many tons of such dust during an hour's operation. The need for equipment to remove the dust and then dispose of it makes such heating and drying devices even more complicated. The presence of such dust in the aggregate used for manufacturing asphalt pavement is not itself a problem is the dust is substantially uniformly distributed throughout the aggregate. Placing dust collected from a rotary kiln back into the aggregate requires thorough remixing for uniform distribution and further complicates the equipment. Kilns of this type are also very cumbersome to move from one location to another, and great care must be taken to prevent damage during movement.

Other apparatus for heating flowable or particulate material have included upright towers through which the material falls. Hot gases are forced through the tower for drying the flowable material as it falls therethrough. Previous apparatus of this type has not been constructed in such a manner that it was capable of heating flowable material efficiently at high production rates.

SUMMARY OF THE INVENTION

Apparatus for flowable material, and particularly for heating and drying wet particulate material, includes an upright hollow tower. The tower has a substantially rectangular cross-sectional shape and includes an outer metal skin having a plurality of cast non-metallic heat insulating modular elements vertically stacked therein. The elements are cast or moulded of materials commonly referred to in the trade as ceramics, although the materials may have a high alumina content and would not be theoretically classified as ceramics. The modular elements freely float within the skin to accommodate relative vertical expansion and contraction. The modular elements are specially constructed to provide a plurality of vertically-spaced downwardly sloping steps extending across substantially the entire length and width of the tower. Alternate steps are reversely inclined to provide a substantially zig-zag path for flowable material falling through the tower. Flowable material falling through the tower is in a free fall condition between steps and in a frictional flowing condition on the steps.

In accordance with one aspect of the invention, gas burners are positioned for directing an extremely high velocity, high temperature wide ribbon of gases transversely of the power intermediate the steps. These gases strike against substantially the entire width of the stream of flowable material when it is in a free fall condition so that the flowable material is fluidized and rapidly dried. The extremely high temperature and high velocity gases produce extremely fast drying due to a high degree of convective heat transfer from the gases to the flowable material. There is direct heat transfer from the gases to the flowable material and very little heat energy is wasted. The extremely high temperature differential between the gases and the flowable material produces extremely rapid heating of the flowable material. The burners are designed to convert thermal energy into kinetic energy for imparting an extremely high velocity to the gases as they enter the tower horizontally. The gases also build up an internal pressure in the tower to push exhaust gases vertically out of the tower. This eliminates the need for exhaust and lower internal exhaust velocities so there is less tendency for fines to be blown out the stack. The heating device constructed in accordance with the present invention operates with an extremely high temperature differential or delta T between the hot gases and the aggregate. The temperature of the hot gases is preferably at the stoichiometric temperature of combustion of air and hydrocarbon fuels, and at least 2,800° F. Preferably, the temperature is above 3,000° F. Air and fuel are fed to the burners at least in the stoichiometric ratio or with a slight excess of air in order to insure complete combustion. The air includes a large percentage of nitrogen and it is possible to beneficiate the burners by adding excess free oxygen into the air stream for obtaining even higher temperatures. It is also important to note that no supplemental or excess air exists within the heating tower. It is the hot gases from the burners themselves which perform the heating function and no excess air is allowed to enter the tower. This arrangement makes it possible to achieve a thermal efficiency approaching 90 percent.

In accordance with another aspect of the invention, feed means is provided in the upper portion of the tower for substantially continuously feeding flowable material into the tower in a substantially continuous wide band stream of substantially uniform thickness extending substantially entirely across the entire width of the tower and steps. ways escape In accordance with another aspect of the invention, the plurality of burners extend upwardly from the lower portion of the tower in vertically-spaced relationship and terminate short of the uppermost plurality of steps in the upper portion of the tower. Flowable material falling in a free fall condition between the plurality of uppermost steps is not directly contacted by gases from any burners. This provides a plurality of cool drop zones and exhaust gases pass through the cool flowable material in these zones. This filters and cools the exhaust gases, and preheats the flowable material to increase the thermal efficiency of the apparatus. The exhaust gases are then very clean and at a temperature of only around 300° F.

In accordance with a further aspect of the invention, the particulate material falls completely through the tower in a predetermined time period. The steps within the tower are arranged and dimensioned for maintaining the time over which particulate material is in a free fall condition as a greater percentage of that predetermined time period than the time over which the particulate material is in rolling and sliding contact with the steps. This maximizes the time during which the particulate material is being fluidized and dried by the extremely high velocity and high temperature gases. The predetermined time period will vary depending upon the height of the tower and type of material being heated. The temperature can also be modulated by adjusting the burners.

In accordance with another aspect of the invention, the tower includes a bottom bin for collecting a mass of flowable material. Flowable material may be withdrawn from the bin through an outlet opening. A mass of hot flowable material ways remains within the bin to form a lower plug for preventing escape of hot gases through the bottom of the tower and forces all of the gases to flow upwardly through the tower. Gases are exhausted by internal pressure within the tower and no exhaust blowers are needed. Exhaust gases also pass upwardly through the cooler incoming flowable material which absorbs heat from exhaust gases and increase the thermal efficiency of the apparatus.

In accordance with a still further aspect of the invention, the non-metallic heat insulating modular elements are vertically stacked within the tower and each includes top, bottom, front and rear edges. A downwardly sloping wall extends in a direction from the top edge toward the bottom edge, and from the rear edge toward the front edge. The wall has a bottom terminal edge positioned adjacent the front edge and spaced upwardly from the bottom edge of the elements. An upwardly sloping wall extends in a direction from the rear edge toward the front edge, and from the bottom edge toward the front edge, to intersect the downwardly sloping wall at the terminal edge. The downwardly sloping wall further has opposite side edges and substantially vertical walls upstand from those side edges. The vertical walls extend from the rear edge of the element toward the front edge thereof over at least a portion of the length of the side edges.

The outer metal skin is internally lined with heat insulating material so that there is very little heat radiation from the tower. The outer metal skin increases in temperature only around 100° F over ambient. The tower always remains cool enough that persons wearing gloves can climb on it to make adjustments or repairs without danger of burns and without feeling any extreme discomfort. The heat insulating material and modular elements also muffle noises and the apparatus operates very quietly so there is no nuisance, and no danger of impairing the hearing of persons attending the apparatus.

A heating apparatus constructed in accordance with the present invention is also easily transferred from one location to another. This ease in portability makes it possible to transfer the apparatus at will to the most suitable location and minimizes long truck hauls of materials.

In a preferred arrangement, the modular elements are vertically stacked in the tower with the terminal edges of the downwardly sloping walls substantially vertically aligned throughout the tower. This makes it possible to use the same sizes of modular elements throughout the tower and still provide a zig-zag path with reversely inclined downwardly sloping steps.

It is a principal object of the present invention to provide an improved apparatus and method for heating flowable material to a desired temperature.

It is also an object of the present invention to provide an apparatus and method for heating flowable material in a more efficient and economical manner than was heretofore pssible.

It is still another object of the invention to provide an improved apparatus and method for heating flowable material in an extremely clean, cool, efficient and quiet manner.

It is a further object of the present invention to provide an improved apparatus and method of heating wet particulate material while eliminating any problem of collecting dust from the particulate paterial.

It is a further object of the present invention to provide an improved apparatus and method for continuously feeding flowable material in a wide band of substantially uniform thickness into a heating tower.

It is an additional object of the present invention to provide an improved construction of a heating tower which eliminates problems of expansion and contraction.

It is another object of the present invention to provide an improved construction for non-metallic heat insulating modular elements used within a heating tower to provide a zig-zag path for flowable material falling through the tower.

BRIEF DESCRIPTION OF THE DRAWINGS

The invention may take form in certain parts and arrangements of parts, a preferred embodiment of which will be described in detail in this specification and illustrated in the accompanying drawings which form a part hereof.

FIG. 4 is a cross-sectional elevational view looking generally in the direction of arrows 4—4 in FIG. 3;

FIG. 5 is a cross-sectional view looking generally in the direction of arrows 5—5 in FIG. 2;

FIG. 6 is an elevational view looking generally in the direction of arrows 6—6 in FIG. 5;

DESCRIPTION OF THE PREFERRED EMBODIMENT

Figure 1:
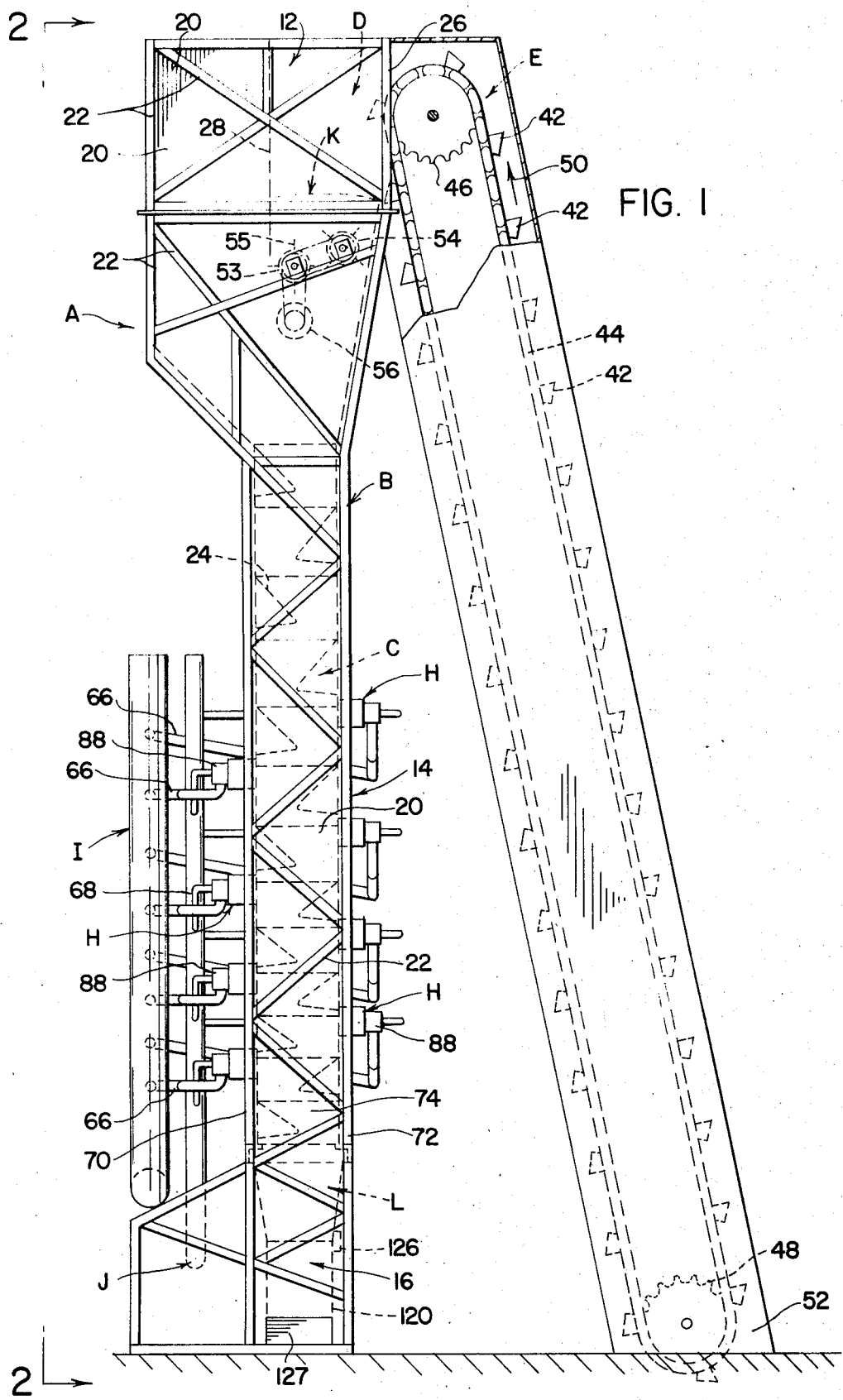
FIG. 1 is a side elevational view showing a heating tower constructed in accordance with the present invention.
Figure 2:
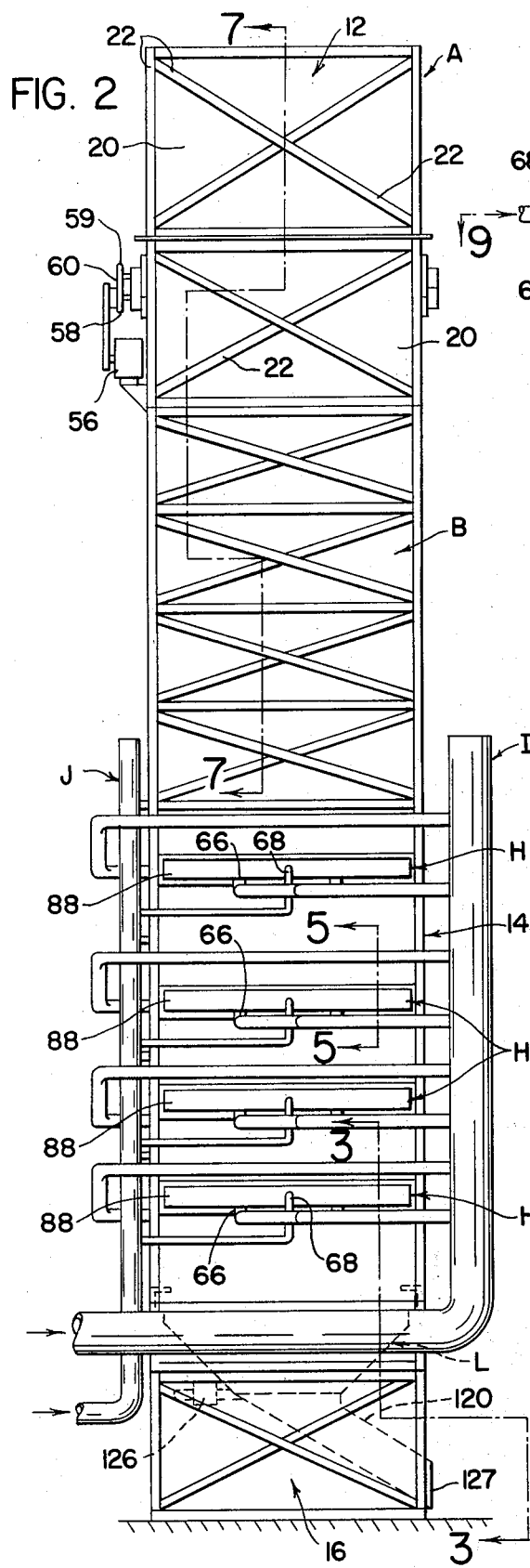
FIG. 2 is an elevational view looking generally in the direction of arrows 2—2 in FIG. 1.
Figure 3:
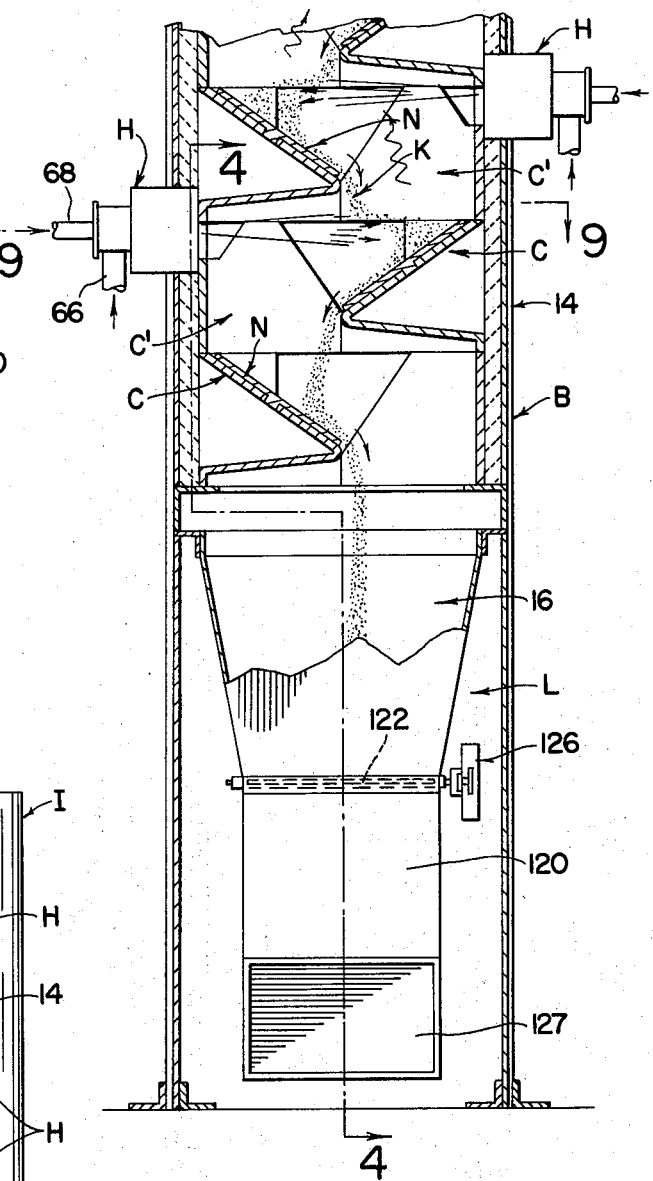
FIG. 3 is a partial cross-sectional elevational view looking generally in the direction of arrows 3—3 in FIG. 2.

Referring now to the drawings, wherein the showings are for purposes of illustrating a preferred embodiment of the invention only and not for purposes of limiting the same, FIG. 1 shows a heating apparatus A having the features of the present invention incorporated therein.

Apparatus A includes a hollow substantially vertical tower B having an upper end portion 12, a main heating portion 14 and a bottom portion 16. Tower B includes an outer metal skin formed from a plurality of metal plates 20 welded together and reinforced as by angle irons 22. This forms a completely closed structure, except for the upper end, to prevent escape of hot gases, and prevent entrance of outside air. Connecting and reinforcing angle irons 22 are all on the outer periphery of plates 20 so that the inner surface of the outer metal skin for tower B is substantially smooth.

A plurality of non-metallic modular elements C, of heat insulating material such as ceramic or the like, are vertically stacked within main heating portion 14 of tower B. Modular elements C form a plurality of vertically-spaced downwardly sloping steps 24 within main heating portion 14 of tower B. Alternate ones of steps 24 are reversely inclined to define a substantially zigzag path within main heating portion 14 of tower B.

In accordance with one arrangement, upper portion 12 of tower B has a rear inlet opening 26 to an inlet hopper D defined by a plate 28 extending completely across the width of the upper portion of the tower in parallel spaced-apart relationship to the wall in which opening 26 is formed. Particulate material is supplied to hopper D by any suitable conveying device such as a bucket conveyor E having a plurality of buckets 42 mounted on a chain 44 which is trained around upper and lower rotatable sprockets 46 and 48. One of sprockets 46 and 48 is rotatably driven by a suitable motor for moving chain 44 and buckets 42 in the direction of arrow 50. Particulate or flowable material is deposited in the area identified by numeral 52 from bins or from other feed conveyors to be picked up by buckets 42 of bucket conveyor E. It will be recognized that bucket conveyor E can be replaced by a belt conveyor which would extend upwardly to opening 26 at a much lower angle than bucket conveyor E.

Figure 7:
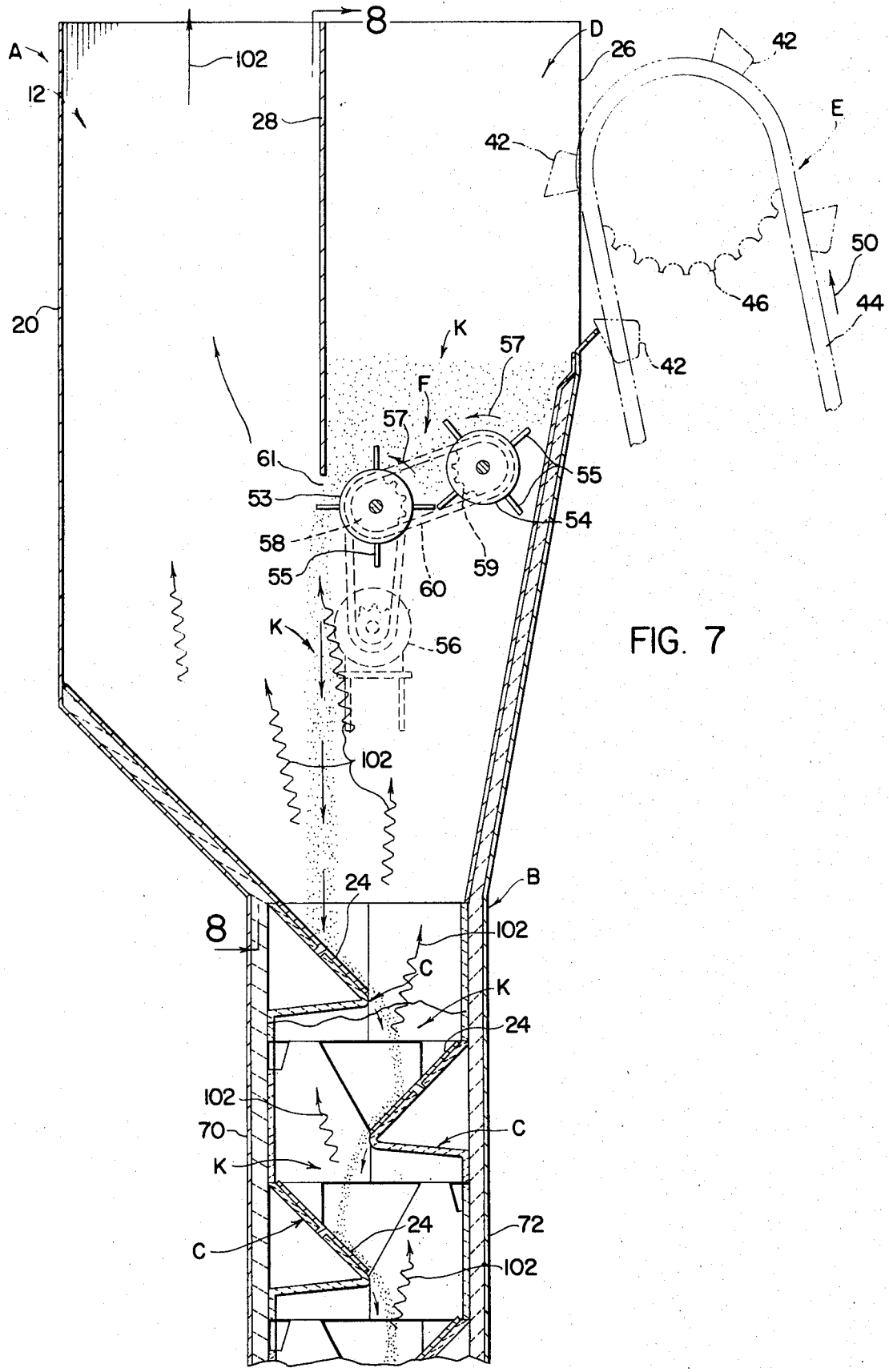
FIG. 7 is a cross-sectional elevational view looking generally in the direction of arrows 7—7 in FIG. 2.
Figure 8:
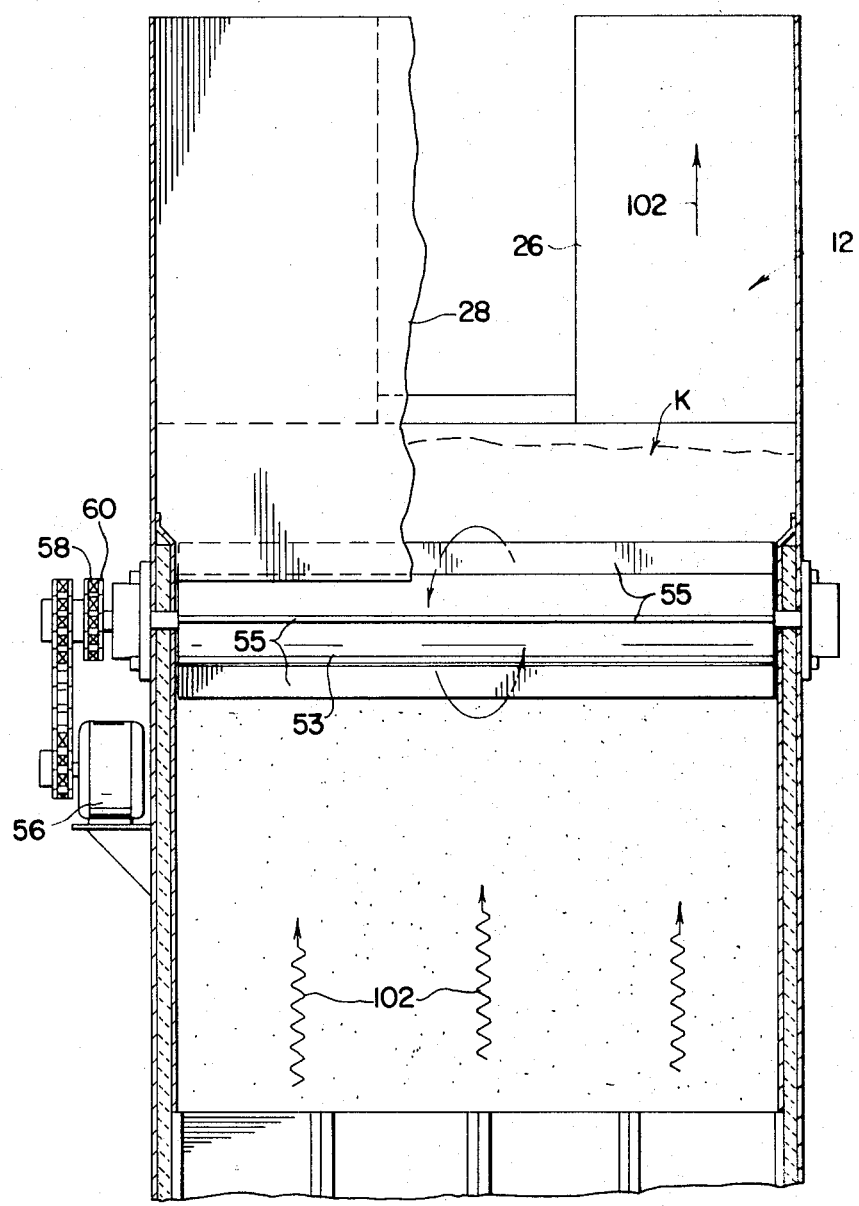
FIG. 8 is a cross-sectional elevational view looking generally in the direction of arrows 8—8 in FIG. 7.
Figure 9:
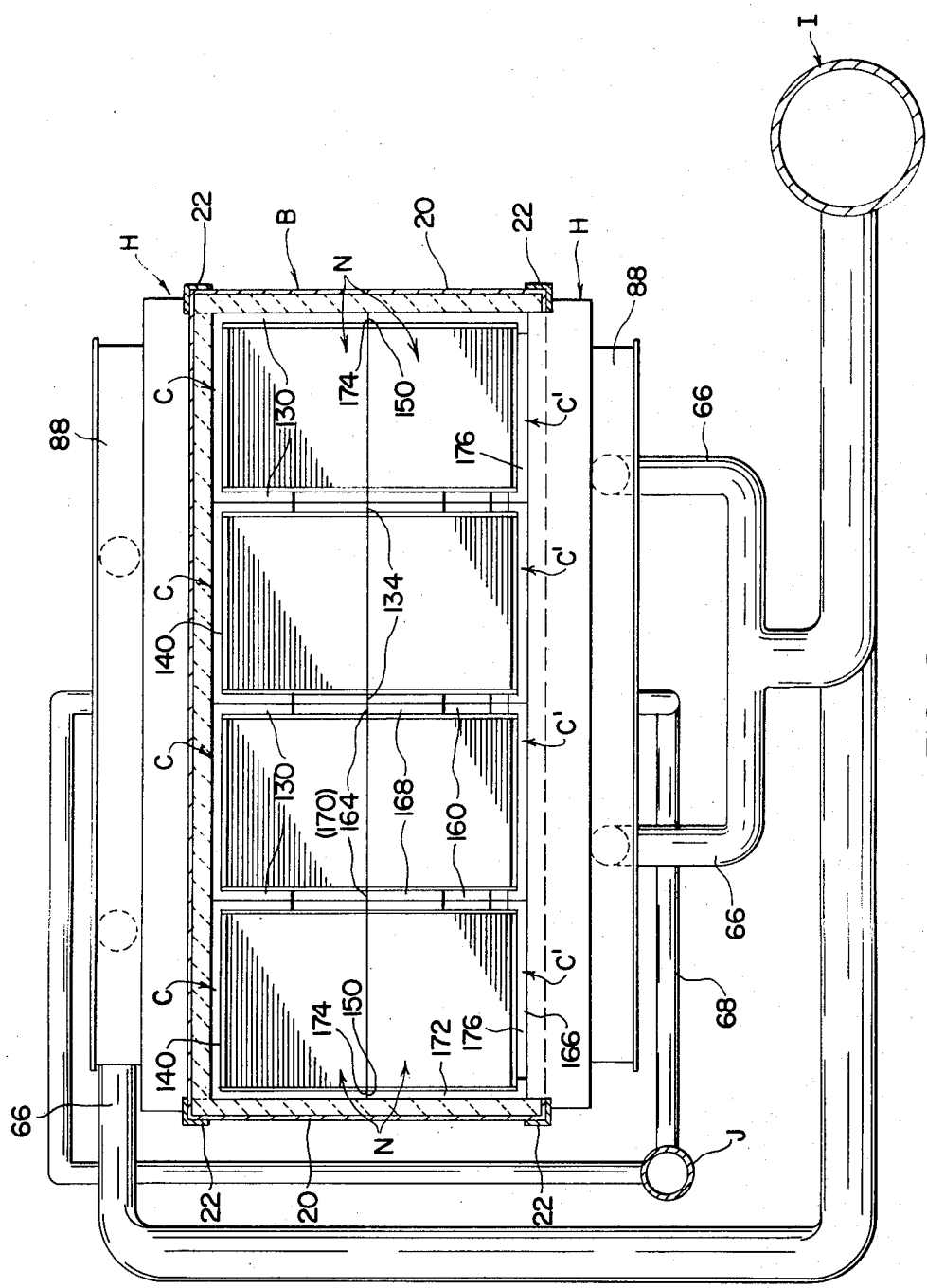
FIG. 9 is a cross-sectional plan view looking generally in the direction of arrows 9—9 in FIG. 3.
Figure 10:
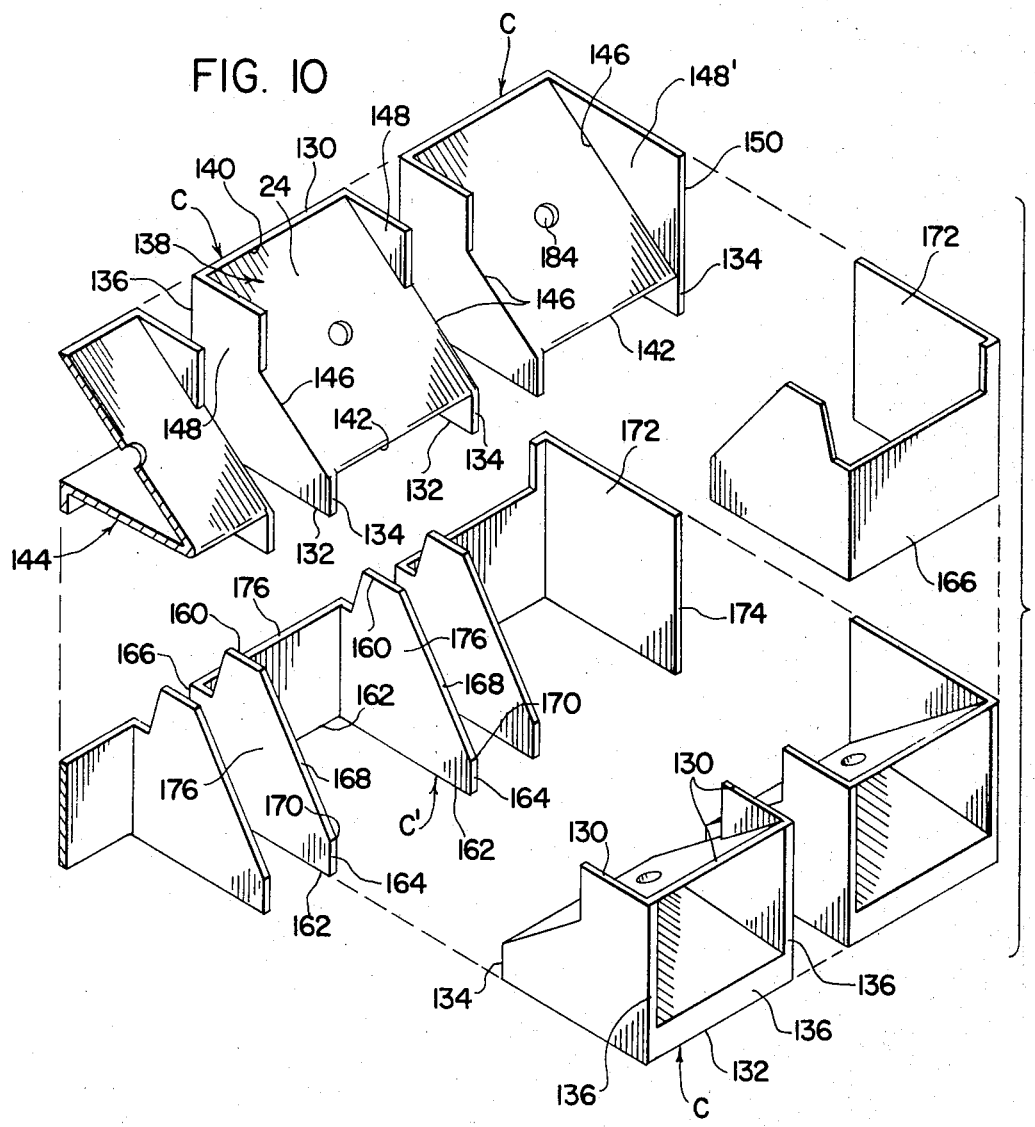
FIG. 10 is a perspective illustration showing the modular elements constructed in accordance with the invention.
Figure 11:
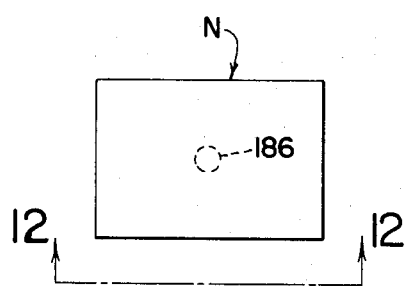
FIG. 11 is a plan view showing a wear element for use with the modular elements of FIG. 10.
Figure 12:
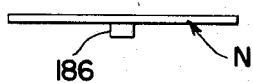
FIG. 12 is an end elevational view looking generally in the direction of arrows 12—12 in FIG. 11.

The open bottom portion of hopper D is normally closed by feed means F in the form of a plate feeder. Plate feeders of this type are generally well known for feeding particulate material in other environments. The feed means includes a pair of spaced-apart rotatable rolls 53 and 54 each having a plurality of radially extending circumferentially-spaced elongated plates 55 thereon. A variable speed motor 56 is drivingly connected with roll 53 for rotating it in the direction of arrow 57 in FIG. 7. Sprockets 58 and 59 attached to one end of rolls 53 and 54 are drivingly connected by chain 60. Energization of motor 56 rotates rolls 53 and 54 in the direction of arrows 57 to discharge material K from hopper D in the area generally indicated by numeral 61. Discharge area 61 is located above the uppermost downwardly sloping step 24 so that material K hits uppermost step 24 in an area slightly above the lower terminal edge of the uppermost step. Material K then falls vertically through tower B under the force of gravity and travels in somewhat of a zig-zag path by striking alternately sloping steps 24. Material K is in a free fall condition between adjacent steps 24 and in a frictional sliding condition when in contact with steps 24. Feed means F substantially continuously feeds material K in a wide band stream of substantially uniform thickness extending substantially entirely across the width of tower B and steps 24. In one arrangement, for feeding wet aggregate, this stream of particulate material is around one inch thick. It will be recognized that other feed means may be used for continuously feeding material in a wide stream of substantially uniform thickness into tower B.

In one arrangement, elongated gas burners H are positioned for directing extremely high temperature gases at an extremely high velocity transversely of tower B intermediate at least certain pairs of steps 24. In a preferred arrangement, burners H extend upwardly from lower portion 16 to tower B in vertically-spaced relationship and terminate short of the uppermost plurality of steps 24 within main heating section 14. That is, the uppermost burner H on main heating section 14 is positioned below several uppermost steps 24. Material K falling in a free fall condition between these uppermost plurality of steps is not directly contacted by hot gases from burners. This provides a plurality of cool drop zones. Internal pressure within tower B forces the exhuast gases from burners H upwardly through tower B and the gases are exhausted to atmosphere through upper portion 12. These exhaust gases travel upwardly through main heating section 14 in a tortuous path. The exhaust gases are filtered and cooled in passing through material K in the cool drop zones between the uppermost plurality of steps. The gases exhausted from upper portion 12 of tower B are then very clean and cool. The exhaust gases also preheat material K in the cool drop zone to increase the thermal efficiency of tower B.

In one arrangement, burners H extend around two-thirds of the way up main heating section 14 and are positioned intermediate each pair of steps 24. Burners H are supplied with air from a main header I which is connected with a blower. Conduits 66 extend from main header I to a manifold connected with the combustion chamber of each burner H. A fuel supply header J is connected with a source of combustible fuel and supplies fuel to the header connected with the combustion chamber of each burner H through conduits 68.

Main drying section 14 has a substantially rectangular cross-sectional shape, and may be considered as having a front side 70, a rear side 72 and a pair of opposite sides 74. Opposite sides 74 are spaced-apart a distance substantially greater than front and rear 70 and 72. Burners H further extend the full width between opposite sides 74 to supply a ribbon of extremely high velocity and extremely high temperature gases across the entire width of steps 24. The high velocity gases strike against flowable material when it is in a free falling condition between adjacent steps. The high velocity gases fluidize the flowable material and thoroughly heat it. The high velocity gases also drive the flowable material higher up on the next lower step and increases the residence time of the flowable material within drying section 14. The high velocity ribbon of gases also disperses the flowable material and keeps it evenly distributed across substantially the entire width of each step 24.

In accordance with one arrangement, burners H include an elongated block 78 of heat resistant material, such as ceramic or the like, having an elongated combustion chamber 80 formed therein. Block 78 is positioned in a rectangular opening 82 formed in the outer metal skin of drying section 14. Combustion chamber 80 has a very narrow outlet 84 extending the full width thereof. In one arrangement, outlet 84 is around seven feet long and one inch wide. Block 78 has brackets or structural members 86 attached thereto for welding or other attachment to angle irons 22 on tower B. Air line 66 is connected by a manifold 88 to block 78, and fuel conduits 68 are connected to manifold 88. Pilots 90 are connected with combustion chamber 80 and include spark igniters 91 connected with a suitable source of voltage 93. Bleed lines 95 from manifold 88 supply a combustible mixture to pilots 90. Manifold 88 extends the full width of block 78, and a narrow slot or plurality of closely spaced small openings 92 communicates between combustion chamber 80 and manifold 88 for supplying a combustible mixture of air and fuel the entire width of combustion chamber 80. Sufficient air is supplied to combustion chamber 80 to obtain complete combustion of all the fuel supplied thereto through conduits 68. The expanded combusted gases within combustion chamber 80 result in a pressure buildup within combustion chamber 80. This results in a conversion of thermal energy to kinetic energy for forcing the extremely high temperature gases through combustion chamber outlet 84 at an extremely high velocity. The temperature of the gases discharged through combustion chamber outlet 84 is above 3,000° F. The velocity of these gases is at least 8,000 feet per minute and preferably above 9,000 feet per minute. By way of example, let it be assumed that it is desired to produce five million BTU's per hour in each burner H for thoroughly and rapidly heating wet aggregate. Each one thousand BTU's per hour requires around 1 cubic foot per hour of gas. This would require feeding five thousand cubic feet per hour of gas to a burner H. The amount of air required to obtain substantially complete combustion is around 10 times the quantity of gas or 50,000 cubic feet per hour of air. This is a total of 55,000 cubic feet per hour of air and gas delivered to manifold 88. The expansion of the combustion gas is roughly 6.9 times so that around 379,500 cubic feet per hour of combusted gases are produced. With an outlet opening 84 7 feet long and 1 inch wide, this will produce a hot gas velocity of around 10,842 feet per minute. It will be recognized that this is given only by way of example and will vary in accordance with the requirement of various sizes of apparatus B and the material being heated.

It is important to note that the fuel is completely combusted within combustion chamber 80 and there is no flame which strikes against the flowable material. The gases striking against the flowable material are completely combusted and at an extremely high temperature. A burner H is positioned beneath each step 24 around two-thirds of the way up heating section 14 on front surface 70 of tower B for directing gases toward an oppositely inclined step 24 on rear wall 72 of tower B. Likewise, a burner H is positioned beneath each step 24 around two-thirds of the way up heating section 14 on rear surface 72 for directing gases toward oppositely inclined steps 24 on front surface 70 of tower B. The hot gases strike against flowable material K while it is in a free fall condition to fluidize the flowable material and drive it up higher on the next lower step 24. Gases from burners H are discharged vertically upward through tower B in a zig-zag path as indicated by arrows 102 in FIG. 7. These gases are then discharged through upper portion 12 of tower B. It is important to note that there are a plurality of cool drop zones defined by the plurality of uppermost steps 24 in the upper portion of main heating section 14. Exhaust gases from burners H cannot escape from tower B without passing through the flowing stream of cool flowable material in these cool drop zones several times. The exhaust gases are filtered several times through the cool particulate material for removing dust from the exhaust gases when aggregate is being heated. Passing the exhaust gases through the stream of material in the cool drop zones also drastically lowers the temperature of the gases escaping from upper portion 12 of tower B. The thermal efficiency of the apparatus is also greatly increased because the exhaust gases preheat the flowable material in the cool drop zone. The mass of material always present within hopper D prevents escape of exhaust gases there-through.

In a preferred arrangement, lower portion 16 of tower B has a storage bin L for retaining a large mass or plug of particulate material K. Bin L has an outlet opening 120 normally closed by a door 122 pivoted as at 124. An adjustable counter-weight 126 is connected with door 122 so that a predetermined mass of material must be within bin L before door 122 will open. A chute 127 extends downwardly from outlet 120. The large mass or plug of particulate material always retained within bin L forms a plug to prevent escape of gases from burners H downwardly through tower B, and forces such gases upwardly through the tower. It is important to note that the gases from burners H cause a pressure buildup within tower B so that gases are pushed vertically out of the tower by this internal pressure. This elminates the need for any exhaust blowers and makes it possible to use a smaller volume of hot gases. This provides lower internal exhaust velocities so there is less tendency for fines to be blown from the stack. It will also be recognized that outlet door 122 for bin L may be motorized and the motor may be connected with a sensing device for sensing the amount of upper level of material within bin L. Such a motorized door would then be selectively opened varying degrees for always maintaining a substantially constant level of material within bin L to form the plug.

The variable speed motor driving rolls 53 and 54 of feed means F may also be connected with a sensing device for sensing the level of material K within hopper D. The feed means can then be operated at a variable rate for maintaining a substantially constant level of material K in hopper D. The variable speed motor also makes it possible to operate the feed means at varying constant rates for feeding material K through tower B at any desired rate.

The interior of the metal skin forming the outer surface of rectangular tower B is lined with high temperature insulation M which is positioned to provide openings therethrough as at 130 in FIG. 5 for burners H. High temperature insulation M is freely stacked within the outer metal skin so that relative movement may occur during expansion and contraction.

In one arrangement, modular elements C include spaced-apart top and bottom edges 130 and 132. Modular elements C also include spaced-apart front and rear edges 134 and 136. Top and bottom edges 130 and 132 lie in spaced-apart parallel planes, as do front and rear edges 134 and 136. These four planes intersect one another on lines which form a three-dimensional rectangle or rectangular solid. Each element C includes a downwardly sloping wall 138. Each wall 138 slopes downwardly from an upper edge 140 toward a lower terminal edge 132, and from rear edge 136 toward front edge 134. Downwardly sloping wall 138 has an upper surface 24 corresponding with and defining steps 24 within tower B. Each element C also includes an upwardly inclined wall 144 which slopes upwardly in a direction from bottom edge 133 toward top edge 130, and from rear edge 136 toward front edge 134. Upwardly inclined wall 144 intersects downwardly inclined wall 138 at terminal edge 142. Terminal edge 142 lies in a common plane with front edge 134 and is spaced upwardly from bottom edge 132. Upwardly inclined wall 144 allows gases from burners H to travel upwardly through tower B in a zig-zag fashion. Nonmetallic modular elements C are cast of alumina or the like. Downwardly inclined wall 138 has opposite parallel edges 146 from which vertical walls 148 upstand. Vertical walls 148 extend from rear edge 136 in a direction toward front edge 134 over at least a portion of the length of opposite side edges 146. Vertical walls 148 have their upper edges lying in a common plane with upper edge 130. Each end element C in each row of modules includes one vertical wall 148' which extends along the entire length of one side edge 146 so that its vertical terminal edge 150 is in a common plane with front edge 134. The modular element on the opposite end of the row has a similar wall to 148' on the opposite side edge 146.

Each alternate layer of modules includes a row of modular elements C' constructed similar to elements C except for the absence of downwardly and upwardly inclined walls 138 and 144. Each element C' includes an upper edge 160 and a bottom edge 162. Each element C' further includes a front edge 164 and a rear edge or surface 166. Top and bottom edges 160 and 162 lie in parallel spaced-apart planes as do front and rear edges 164 and 166. These planes intersect one another along lines defining a cube of the same dimensions as the defined cube for modular elements C. Modular elements C' also have downwardly inclined opposite edges 168 which terminate at terminal edges 170 lying in a common plane with front edge 164 and spaced above bottom edge 162. The end element C' in each row includes a rectangular side wall 172 having a vertical edge 174 corresponding with and lying in a common plane with front edge 164. The rear portions of each modular element C' are cut away in a direction from top edge 160 toward bottom edge 162 to define an edge 176 spaced downwardly from top edge 160.

Modular elements C and C' are vertically stacked within tower B and within high temperature insulation M in a plurality of layers. Each layer includes one row of a plurality of modular elements C and an opposite row of a plurality of modular elements C'. The number of elements in each row varies depending upon the capacity for which tower B is designed. Each modular element in each row is positioned with its opposite side edges contacting one another. Each modular element C' in each row is also positioned with its opposite side edges contacting one another. Modular elements C in each row of each layer also have their front edges 134 contacting front edges 164 of modular elements C' in the opposite row. In each layer, the row of modular elements C have their bottom edges 132 resting on top edges 160 of the row of modular elements C' in the next lower layer. Likewise, each row of modular elements C' in each layer have their bottom edges 162 resting on top edges 130 of the row of modular elements C in the next lower layer. With all of these surfaces contacting, modular elements C and C' hold one another together and also hold high temperature insulation M within the outer metal skin of tower B. Modular elements C and C', together with high temperature insulation M, freely float relative to the outer metal skin of tower B to accommodate relative expansion and contraction.

As best shown in FIG. 5, modular elements C and C' are located within tower B so that outlet 84 from combustion chamber 80 of burners H is directed toward the vertical space provided between top edges 160 and downwardly spaced edges 176 of modular elements C'. Vertical walls 148 on elements C, and vertical walls 176 on elements C', provide vertical columns for strength and providing support for upper elements. The bottommost layer of modular elements C and C' rests on spaced-apart beams 180 as shown in FIG. 4.

In one arrangement, tower B is dimensioned so that it takes flowable material a predetermined time period of around 16 seconds to fall from hopper D to bin L through drying section 14. It will be recognized that this time will vary depending upon the height of tower B, the number and slope of steps 24, and the material being heated. Steps 24 are dimensioned and arranged so that flowable material K is in a free fall condition between adjacent steps for a greater percentage of that predetermined time period than the time over which such material is in frictional flowing contact on steps 24. In one arrangement, flowable material is in a free fall condition and being contacted by the extremely high velocity and high temperature gases from burners H over a time period of around 10 seconds, and is in frictional sliding contact on steps 24 for around 6 seconds. This maximizes convective heating of the flowable material. Thus, beginning and terminal edges 140 and 142 of each downwardly inclined wall 138 are spaced apart a predetermined vertical distance. Terminal edges 142 in one layer are vertically spaced from terminal edges 142 of the next lower layer of modular elements C by a distance greater than the vertical distance between beginning and terminal edges 140 and 142. Beginning and terminal edges 140 and 142 are also horizontally spaced apart a predetermined horizontal distance. The terminal edge 142 of element C in one layer is horizontally spaced from a beginning edge 140 of element C in a lower layer by distance which is at least as great as a major portion of that predetermined horizontal distance. In the arrangement shown and described, terminal edges 142 of elements C in each layer are also substantially vertically aligned throughout drying portion 14 of tower B.

In one arrangement, modular elements C are cast from heat resistant material having a high alumina content. Such material is not very wear resistant and downwardly inclined walls 138 would be rapidly worn away due to contact therewith by particulate material K. Therefore, rectangular wear plates N of silicon carbide are positioned on upper surfaces 24 of downwardly sloping walls 138. Walls 138 are cast with a centrally located hole 184 therethrough and silicon carbon wear plates are cast with a centrally located bottom projection 186. Projection 186 is receivable in hole 184 to define cooperating releasable attaching means on walls 138 and plates N for releasably attaching plates N to upper surfaces 24 of walls 138. Silicon carbide plates N are much more wear resistant to the abrading action of flowable material K as it falls through drying section of tower B. Tower B is large enough so that a man can climb downward or upward therethrough for replacing wear plates N as the occasion arises.

In accordance with an important aspect of the invention, steps 24 in the upper portion of heating section 14 sloped downwardly at deeper angles than step 24 in the lower portion of heating section 14. In one arrangement, steps 24 in the upper third of section 14 sloped downwardly at around 45°; steps 24 in the middle one third of section 14 sloped downwardly at angles of around 40°; and steps 24 in the lower one third of section 14 sloped downwardly at angles of around 35°. Thus, there are three different sizes of elements C and C'. Elements C and C' in the upper one third portion of section 14 have a height of around 25 inches; elements C and C' in the middle one third of section 14 have a height of around 21 inches; and elements C and C' in the lower one third of section 14 have a height of around 18 inches. Likewise, walls 138 and edges 168 of elements C and C' in the upper one third of section 14 slope downwardly at angles of around 45°. Walls 138 and edges 168 of elements C and C' in the middle one third of section 14 slope downwardly at angles of around 40°. Walls 138 and edges 168 of elements C and C' in the lower one third of section 14 slope downwardly at angles of around 35°. This arrangement makes it possible to reduce the height of tower B while maintaining substantially the same residence time for flowable material falling therethrough. In heating wet particulate material such as aggregate, a steep slope is required for steps 24 in the upper portion of section 14 so that the material will fall downwardly from the steps and will not build up thereon. As the material becomes drier, steps 24 can slope downwardly at lower angles and the drier flowable material will readily fall therefrom. The arrangement described also maintains a maximum transverse spacing between the terminal edge of each step and the upper surface of the next lower step. This maximum spacing is desirable so that free falls are maximized and a person may freely climb through the tower for replacing wear plates N or for inspection purposes. This transverse spacing is smallest between the modular elements in the lower one-third of section 14; somewhat greater between the modular elements in the middle one-third of section 14; and greatest between the modular elements in the upper one-third of section 14. This is due to the greater heights and wall angles of the modular elements in the middle and upper one-thirds of section 14. This provides progressively greater areas moving upwardly of the tower for exhausting gases and the overall height of the tower is minimized. The square foot area for exhausting gases can be smaller in the lower and middle one-third portions because all exhaust gases from the burners do not pass through those areas. The areas are greatest in the upper portion of portion 14 for accommodating discharge of gases from all the burners. The volume of exhaust gases is greatest at the top, and the greater area permits free and rapid exhaustion of all the gases. The height of the tower is minimized by reducing the size of the modular elements, and the area for gas exhaustion, where the volume of gases is not as great as at the top. It will be recognized that the dimensions and angles given by way of example will vary in accordance with requirements of the flowable material being heated. In stating that terminal edges 142 of each element C are substantially vertically aligned throughout section 14, it is meant that these edges do not transversely overlap, or are not transversely spaced, more than around a couple of inches. It is possible to have terminal edges 142 out of vertical alignment somewhat simply by constructing modular elements C' so that their front to rear dimension is slightly greater or smaller than the front to rear dimension of modular elements C.

Figure 13:
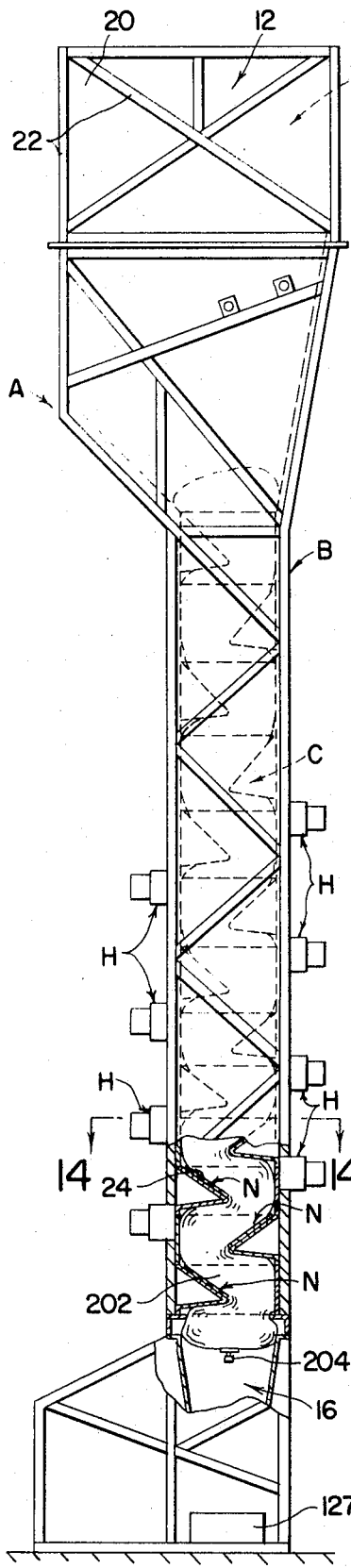
FIG. 13 is an elevational view similar to FIG. 1 showing an advantageous arrangement for transportation.
Figure 14:
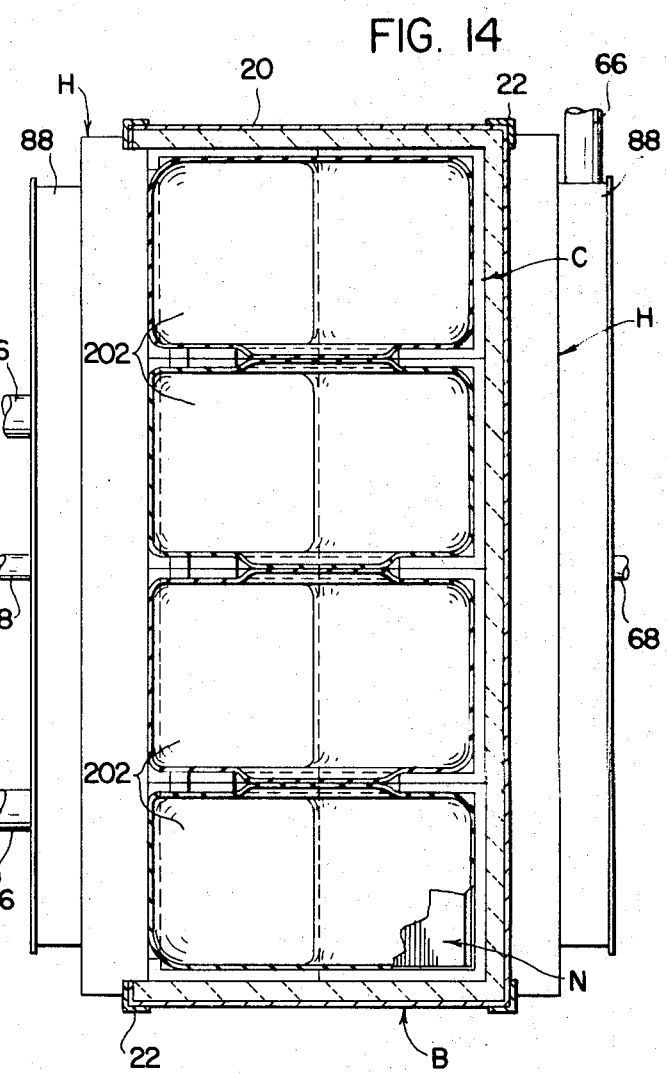
FIG. 14 is a cross-sectional plan view looking in the direction of arrows 14—14 of FIG. 13.

An advantageous arrangement for transporting apparatus A to a customer, or from one location to another while holding wear plates N in position and without damaging modular elements C and C' is shown in FIGS. 13 and 14. A plurality of elongated flexible inflatable bags 202 are extended completely through main heating section 14. Bags 202 may be made of any suitable material, such as natural or synthetic rubber, or synthetic plastics, having sufficient strength and thickness to avoid repture. Bags 202 have at least one suitable valve 204. It will be recognized that a plurality of such valves may be provided on bags 202, and that they may be located at both the upper and lower ends of bags 202. Once bags 202 are completely extended through section 14 and past all of steps 24, air pressure is supplied thereto through valves 204. This inflates bags 202 like balloons so that they occupy substantially all of the vacant spaces to firmly hold modular elements C and C' against movement within the outer metal skin of section 14 and prevent dislodgment of wear plates N. Only a very low air pressure of around one to a few psig is required for firmly holding the modular elements in position and preventing dislodgment of wear plates N while apparatus A is transported. Once apparatus A is again installed in its vertical position, the air is exhausted from bags 202 and the bags removed so the apparatus can be placed in operation.

For heating certain other materials which do not require such high temperatures, it will be recognized that ceramic modular elements C and heat resistant material M can be eliminated. Downwardly inclined metal plates or the like could then be installed within heating section 14 to define downwardly inclined steps 24. It will be recognized that certain features of the present invention are useful with such apparatus and that ceramic modular elements C and C' are not required for certain applications.

It will be recognized that the apparatus of the present invention processes exhaust gases with cleanliness and efficiency. The exhaust gases are at a relatively low temperature and the external skin of the entire apparatus also remains very cool.

It has been found that an aggregate drying apparatus constructed in accordance with the present invention operates at a fuel efficiency of around ninety percent. When it is desired to dry aggregate at a lesser rate than the maximum capacity of apparatus A, certain of burners H may be shut down while the others continue to operate at a maximum efficiency.

Although the invention has been described with reference to a preferred embodiment, it is obvious that equivalent alterations and modifications will occur to others skilled in the art upon the reading and understanding of the specification. The present invention includes all such equivalent alterations and modifications and is limited only by the scope of the claims.

I claim:

1. Apparatus for heating flowable material comprising; hollow tower means having an upper end portion and a lower end portion, a plurality of vertically-spaced downwardly sloping elongated steps of predetermined width in said tower means, said steps having downwardly sloping upper surfaces terminating at lower terminal edges, said terminal edges on each of said steps being spaced from said upper surfaces on next lower steps by a terminal edge to upper surface spacing distance, feed means in said upper portion of said tower for substantially continuously feeding flowable material into said tower in a substantially continuous wide band stream extending substantially entirely across said predetermined width and having a substantially uniform thickness which is substantially less than said spacing distance so that flowable material traveling through said tower is in a free fall condition between said steps and in a frictional flowing condition on said steps, heating means for directing a high velocity ribbon of high temperature gases intermediate at least certain of said steps transversely of said tower substantially entirely across said predetermined width, said heating means being positioned for directing said gases beneath at least certain of said terminal edges toward an upper surface of a next lower step to strike flowable material falling through said tower when it is in a free falling condition between adjacent steps, and said gases having a velocity to fluidize and heat said material while it is in a free falling condition and to drive said material laterally onto a higher portion of said next lower step than said material would strike if allowed to free fall in the absence of said gases.

2. The device of claim 1 wherein flowable material falls completely through said tower in a predetermined time period, said steps being arranged and dimensioned for maintaining the time over which flowable material is in said free fall condition as a greater percentage of said predetermined time period than the time over which flowable material is in said frictional flowing condition.

3. The device edges, claim 1 wherein said downwardly sloping steps have beginning edges said terminal edges of each of said steps being vertically spaced from an upper surface of a next lower step by a distance greater than the vertical distance between a beginning edge and a terminal edge of one of said steps.

4. The device of claim 3 wherein alternate ones of said steps are reversely inclined.

5. The device of claim 4 wherein said heating means is positioned for directing said high velocity and high temperature gases in a direction toward an inclined surface of one of said steps.

6. The device of claim 4 wherein said beginning and terminal edges of each of said steps are horizontally spaced-apart a predetermined horizontal distance, said terminal edge of each of said steps being horizontally spaced from a beginning edge of a next lower step a distance at least as great as a major portion of said predetermined horizontal distance.

7. The device of claim 4 wherein said terminal edges of said steps are substantially vertically aligned throughout said tower.

8. The device of claim 1 wherein said terminal edges are substantially vertically aligned throughout said tower.

9. The device of claim 1 wherein alternate ones of said steps are reversely inclined.

10. The device of claim 1 wherein said steps include a plurality of uppermost steps, said burner means including a plurality of vertically-spaced burners extending upwardly from said lower portion of said tower toward said upper portion of said tower, said plurality of burners including an uppermost burner positioned below said plurality of uppermost steps so that said plurality of uppermost steps provide a plurality of cool drops wherein flowable material in a free fall condition between said uppermost steps is not contacted by hot gases directly from said burners, gases from said burners being exhausted upwardly through said upper portion of said tower and being filtered and cooled by passing through flowable material in said cool drops, said flowable material being preheated by exhaust gases passing therethrough to increase the fuel efficiency of said apparatus.

11. The device of claim 10 wherein said steps in said upper portion of said tower slope downwardly at steeper angles than in said lower portion of said tower.

12. The device of claim 11 wherein alternate ones of said steps are reversely inclined.

13. The device of claim 12 wherein flowable material falls through said tower in a predetermined time period, said steps being arranged and dimensioned for maintaining the time over which flowable material is in said free fall condition as a greater percentage of said predetermined time period than the time over which flowable material is in said frictional flowing condition.

14. The device of claim 13 wherein said tower means has a bottom portion including bin means for retaining a mass of flowable material, said bin means including a bin outlet, whereby a mass of flowable material in said bin acts as a plug to prevent escape of said gases through said bin outlet.

15. The device of claim 12 wherein said terminal edges are substantially vertically aligned throughout said tower.

16. The device of claim 10 wherein said tower means has a bottom portion including bin means for retaining a mass of flowable material, said bin means including a bin outlet, whereby a mass of flowable material in said bin acts as a plug to prevent escape of said gases through said bin outlet.

17. The device of claim 11 wherein said tower means has a bottom portion including bin means for retaining a mass of flowable material, said bin means including a bin outlet, whereby a mass of flowable material in said bin acts as a plug to prevent escape of said gases through said bin outlet.

18. The device of claim 12 wherein said tower means includes an outer metal skin having a substantially rectangular cross-sectional shape and a plurality of nonmetallic modular elements of heat insulating material freely stacked within said skin, whereby said skin and modular elements flat relative to one another during expansion and contraction, said sloping steps being defined by surfaces of said modular elements.

19. The device of claim 18 wherein said modular elements include front, rear, top and bottom edges, said elements being vertically stacked in a plurality of layers with said top and bottom edges of said elements in adjacent layers containing one another, each of said layers including a plurality of said elements, said elements in each of said layers being reversely positioned in a pair of rows with said front edges thereof facing and contacting one another, said elements in one of said rows having a downwardly sloping wall sloping downwardly in a direction from said top edge toward said bottom edge and from said rear edge toward said front edge, said downwardly sloping wall having an upper surface corresponding with said surfaces which define said sloping steps.

20. The device of claim 19 wherein said elements in said one row further include an upwardly sloping wall sloping upwardly in a direction from said bottom edge toward said top edge and from said rear edge toward said front edge, said upwardly sloping wall intersecting said downwardly sloping wall at said terminal edge.

21. The device of claim 20 wherein said terminal edge is spaced upwardly from said bottom edge.

22. The device of claim 21 wherein said downwardly sloping wall has side edges and further including upstanding side walls upstanding from said side edges and extending from said rear edge toward said front edge over at least a portion of the length of said side edges.

23. The device of claim 22 and further including substantially rectangular wear plates positioned on said upper surfaces of said downwardly sloping walls.

24. The device of claim 23 and further including cooperating releasable attaching means on said wear plates and said downwardly sloping walls for releasably attaching said wear plates to said upper surfaces.

25. The device of claim 22 wherein said rows in alternate layers are reversely arranged so that said one elements are in one row in one layer and in the other row in adjacent layers.

26. The device of claim 25 wherein said downwardly sloping walls have terminal edges and said terminal edges of said elements in all of said layers are substantially vertically aligned.

27. The device of claim 19 wherein said elements in the other of said rows have rear walls, said rear walls being cut away adjacent said top edges to provide openings, said gases being directed through said openings.

28. The device of claim 19 wherein each of said pair of rows includes a plurality of said elements positioned side-by-side.

29. The device of claim 1 wherein said steps in said upper portion of said tower slope downwardly at steeper angles than in said lower portion of said tower.

30. The device of claim 29 wherein alternate ones of said steps are reversely inclined.

31. The device of claim 30 wherein said tower means includes an outer metal skin having a substantially rectangular cross-sectional shape and a plurality of nonmetallic modular elements of heat insulating material freely stacked within said skin, whereby said skin and modular elements flat relative to one another during expansion and contraction, said sloping steps being defined by surfaces of said modular elements.

32. The device of claim 31 wherein said tower means includes an outer metal skin having a substantially rectangular cross-sectional shape and a plurality of nonmetallic modular elements of heat insulating material freely stacked within said skin, whereby said skin and modular elements flat relative to one another during expansion and contraction, said sloping steps being defined by surfaces of said modular elements.

33. The device of claim 32 wherein said elements in said one row further include an upwardly sloping wall sloping upwardly in a direction from said bottom edge toward said top edge and from said rear edge toward said front edge, said upwardly sloping wall intersecting said downwardly sloping wall at said terminal edge.

34. The device of claim 33 wherein said terminal edge is spaced upwardly from said bottom edge.

35. The device of claim 34 wherein said terminal edges of said elements in all of said layers are substantially vertically aligned.

36. The device of claim 1 wherein said tower means includes an outer metal skin having a substantially rectangular cross-sectional shape and a plurality of nonmetallic modular elements of heat insulating material freely stacked within said skin whereby said skin and modular elements float relative to one another during expansion and contraction, said sloping steps being defined by surfaces of said modular elements.

37. The device of claim 36 wherein said modular elements include front, rear, top and bottom edges, said elements being vertically stacked in a plurality of layers with said top and bottom edges of said elements in adjacent layers contacting one another, each of said layers including a plurality of said elements, said elements in each of said layers being reversely positioned in a pair of rows with said front edges thereof facing and contacting one another, said elements in one of said rows having a downwardly sloping wall sloping downwardly in a direction from said top edge toward said bottom edge and from said rear edge toward said front edge, said downwardly sloping wall having an upper surface corresponding with said surfaces which define said sloping steps.

38. The device of claim 37 wherein said elements in said one row further include an upwardly sloping wall sloping upwardly in a direction from said bottom edge toward said top edge and from said rear edge toward said front edge, said upwardly sloping wall intersecting said downwardly sloping wall at said terminal edge.

39. The device of claim 38 wherein said terminal edge is spaced upwardly from said bottom edge.

40. The device of claim 39 wherein said downwardly sloping wall has side edges and further including upstanding side walls upstanding from said side edges and extending from said rear edge toward said front edge over at least a portion of the length of said side edges.

41. The device of claim 40 and further including substantially rectangular wear plates positioned on said upper surfaces of said downwardly sloping walls.

42. The device of claim 41 and further including cooperating releasable attaching means on said wear plates and said downwardly sloping walls for releasably attaching said wear plates to said upper surfaces.

43. The device of claim 37 wherein said rows in alternate layers are reversely arranged so that said one elements are in one row in one layer and in the other row in adjacent layers.

44. The device of claim 43 wherein said downwardly sloping walls have terminal edges and said terminal edges of said elements in all of said layers are substantially vertically aligned.

45. The device of claim 37 wherein said elements in the other of said rows have rear walls, said rear walls being cut away adjacent said top edges to provide openings, said gases being directed through said openings.

46. The device of claim 37 wherein each of said pair of rows includes a plurality of said elements positioned side-by-side.

47. The device of claim 37 wherein said downwardly sloping wall has side edges and further including upstanding side walls upstanding from said side edges and extending from said rear edge toward said front edge over at least a portion of the length of said side edges.

48. The device of claim 1 wherein said heating means comprises gas burner means and said high velocity is imparted to said gases by conversion of thermal energy to kinetic energy in said burner means.

49. Apparatus for heating flowable material comprising; an elongated upright tower through which flowable material falls, said tower including an outer metal skin, a plurality of non-metallic modular elements freely stacked on top of one another in said skin and being restrained against collapse by said skin so that relative expansion and contraction between said skin and elements freely occurs, said elements including surfaces forming a plurality of vertically-spaced downwardly sloping steps in said tower, and heating means for directing high temperature high velocity gases intermediate at least certain of said steps.

50. The device of claim 49 wherein said tower includes upper and lower portions and said modular elements in said upper portion have said surfaces thereon sloping at steeper angles than said surfaces on said modular elements in said lower portion.

51. The device of claim 50 wherein alternate ones of said steps are reversely inclined.

52. The device of claim 51 wherein said steps have terminal edges substantially vertically aligned throughout said tower.

53. A non-metallic modular element for use in a tower for drying flowable material, said element having top, bottom, front and rear edges and opposite sides, and a downwardly sloping wall extending in a direction from said top edge toward said bottom edge and from said rear edge toward said front edge.

54. The element of claim 53 wherein said wall has a bottom terminal edge positioned adjacent said front edge and spaced upwardly from said bottom edge of said element.

55. The element of claim 54 wherein said downwardly sloping wall has opposite side edges and further including substantially vertical walls upstanding from said side edges, said vertical walls extending from said rear edge of said element toward said front edge thereof over at least a portion of the length of said side edges.

56. The element of claim 55 and further including an upwardly sloping wall extending in a direction from said rear edge toward said front edge and from said bottom edge toward said front edge, said upwardly sloping wall intersecting said downwardly sloping wall at said terminal edge.

57. The element of claim 54 and further including an upwardly sloping wall extending in a direction from said rear edge toward said front edge and from said bottom edge toward said front edge, said upwardly sloping wall intersecting said downwardly sloping wall at said terminal edge.

58. The element of claim 53 wherein said downwardly sloping wall has opposite side edges and further including substantially vertical walls upstanding from said side edges, said vertical walls extending from said rear edge of said element toward said front edge thereof over at least a portion of the length of said side edges.

59. The element of claim 53 and further including an upwardly sloping wall extending in a direction from said rear edge toward said front edge and from said bottom edge toward said top edge, said upwardly sloping wall intersecting said downwardly sloping wall at a terminal edge.

60. The element of claim 59 wherein said terminal edge is located adjacent said front edge and spaced upwardly from said bottom edge.

61. The element of claim 53 wherein said wall has an upper surface and further including a substantially rectangular wear plate positioned on said upper surface.

62. The element of claim 61 and further including cooperating releasable attaching means on said wall and plate for releasably attaching said plate to said wall.

63. The element of claim 53 wherein said wall has an upper surface and further including releasable attachment means on said wall for releasably attaching a substantially rectangular wear plate to said upper surface.

64. A method for heating flowable material in a hollow upright tower having a plurality of vertically-spaced downwardly sloping steps therein, said steps having downwardly sloping upper surfaces terminating at lower terminal edges, said steps being spaced and positioned so that material flowing through said tower is in a free falling condition between each terminal edge and a next lower one of said upper surfaces, comprising the steps of; introducing flowable material into the upper portion of said tower, said material being in a free fall condition between said steps and in a frictional flowing condition on said steps, directing a high velocity and high temperature ribbon of gases transversely of said tower against said material when said material is in said free fall condition, said gases having a sufficient velocity to fluidize and heat said material, while said material is in said free fall condition said gases being produced by a gas burner, and converting thermal energy to kinetic energy in said burner to impart said high velocity to said gases.

65. The method of claim 64 and further including the step of feeding said material into said tower in a wide band of substantially uniform thickness.

66. The method of claim 65 and further including the step of forcing said material laterally and upwardly onto said steps with said high velocity gases.

67. The method of claim 64 wherein said material falls through said tower in a predetermined period of time and said material is in said free fall condition for a greater percentage of said predetermined period of time than in said frictional flowing condition.

68. The method of claim 66 wherein said flowable material comprises particulate material having dust therein, said high velocity and high temperature ribbon of gases being directed against said material in vertically spaced locations extending upwardly from the lower portion of said tower and terminating substantially short of the top portion of said tower to provide a plurality of cool drop zones in the upper portion of said tower where said material in a free fall condition between steps and is not directly contacted by ribbons of high velocity and high temperature gases, and including the step of exhausting gases vertically through said tower by internal pressure in filtering dust from exhaust gases by passing such gases through said material in said cool drop zones.

69. A heating apparatus arranged for transportion comprising; an elongated substantially rectangular tower having an outer metal skin, a plurality of ceramic modular elements freely stacked within said skin and forming a plurality of vertically-spaced and reversely inclined downwardly sloping steps within said skin when said tower is in an upright position, an elongated flexible bag extending through said tower and past said steps, and means for inflating said bag to firmly hold said elements against damaging movement relative to said skin and one another when said tower is placed in a horizontal position and transported from one location to another.

70. A method for transporting a heating apparatus of the type including an elongated substantially rectangular tower having an outer metal skin and a plurality of ceramic modular elements freely stacked within said skin to form a plurality of vertically-spaced and reversely inclined downwardly sloping steps within said skin when said tower is in an upright position, comprising the steps of; positioning an elongated flexible bag through said tower extending past said steps, and inflating said bag against said modular elements to hold said elements against movement relative to said skin and one another when said tower is placed in a horizontal position and transported from one location to another.

* * * * *